United States Patent [19]

Reitmeier et al.

[11] 4,352,122
[45] Sep. 28, 1982

[54] ADAPTIVE COMPOSITE-COMPONENT TRANSCODING HIERARCHY FOR DIGITAL VIDEO

[75] Inventors: Glenn A. Reitmeier, Trenton; Robert A. Dischert, Burlington, both of N.J.

[73] Assignee: RCA Corporation, New York, N.Y.

[21] Appl. No.: 239,613

[22] Filed: Mar. 2, 1981

[51] Int. Cl.³ .................... H04N 9/42; H04N 9/38; H04N 9/535
[52] U.S. Cl. ...................................... 358/11; 358/13; 358/31
[58] Field of Search ................ 358/11, 13, 12, 31, 358/133, 138

[56] References Cited

U.S. PATENT DOCUMENTS 4,141,034  2/1979  Netravali et al. ............... 358/13
4,320,416  3/1982  Dischert et al. ................ 358/138

Primary Examiner—John C. Martin
Attorney, Agent, or Firm—E. M. Whitacre; W. H. Meise; H. T. Steckler

[57] ABSTRACT

An apparatus for providing component-to-composite and vice versa transcodings of a sampled video signal features generating steering bits that indicate which of combinations of surrounding samples of a composite signal has a component that provides the closest match to the corresponding component of an original component video signal. This allows successive transcodings with a minimum of crosstalk between components, e.g., luminance and chrominance.

16 Claims, 6 Drawing Figures

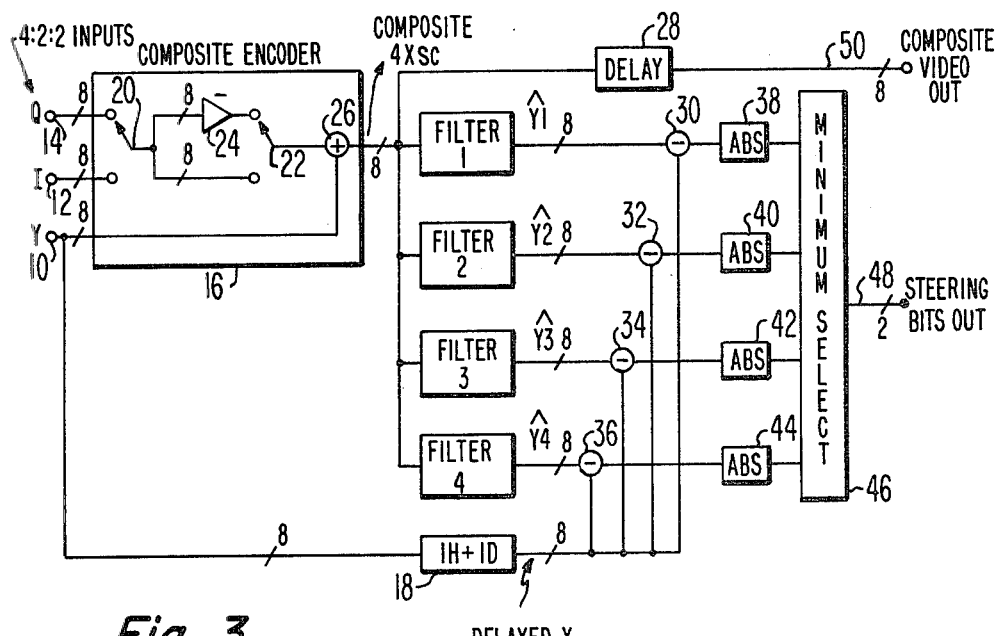

ADAPTIVE COMPOSITE-COMPONENT TRANSCODING HIERARCHY FOR DIGITAL VIDEO

BACKGROUND OF THE INVENTION

The present invention relates to transcoding video signals between component and composite forms, and more particularly to an adaptive system which minimizes decoding errors normally associated with decoding the composite signal.

Heretofore it has been common practice to generate and process composite video signals throughout the entire television studio. However, for sophisticated signal processing applications, e.g., geometric special effects, such as rotation and changes in size, it has been found that it is best to process the individual video component signals (Y, I, Q or R, G, B, etc.), since the frequency and phase of the color subcarrier will change during said processing of the composite signal, which subcarrier is not present in a component system. Further, it is highly possible that the standards ultimately adopted for digital video will comprise both component and composite formats. Of course, component video signals must be reassembled into composite form to conform to NTSC or any other standard presently permitted before being broadcast. Unfortunately, present systems of transcoding from component to composite video and vice versa cause errors due to the inability to perfectly separate luminance (Y) and chroma (I and Q) components from a composite signal.

In particular, the problem is caused by the overlapping frequency spectrums of the luminance and chroma signals. Low-pass ang band-pass filters do a poor job of separation due to said overlapping spectrum. Comb filtering does a better job in that high frequency horizontal luminance resolution is preserved and separated from the chroma signal, but provides poor vertical resolution. Thus both types of filters result in some type of crosstalk between channels.

It is therefore an object of the invention to provide a system capable of transcoding between composite and component video signals and vice versa with a minimum of crosstalk.

SUMMARY OF THE INVENTION

Method and apparatus comprising forming a composite video signal from component video signals, transmitting samples of said composite video signal, and transmitting a control signal indicative of which of combinations of surrounding samples of said transmitted samples has a component that provides the closest match to the corresponding component of the original component video signals.

DESCRIPTION OF THE DRAWINGS

FIG. 1 shows component samples of a television scanning raster;

FIG. 2 shows composite samples generated from the component samples of FIG. 1;

FIG. 3 shows a block diagram of a component-to-composite transcoder in accordance with the invention;

DETAILED DESCRIPTION OF THE INVENTION

Figure 4:
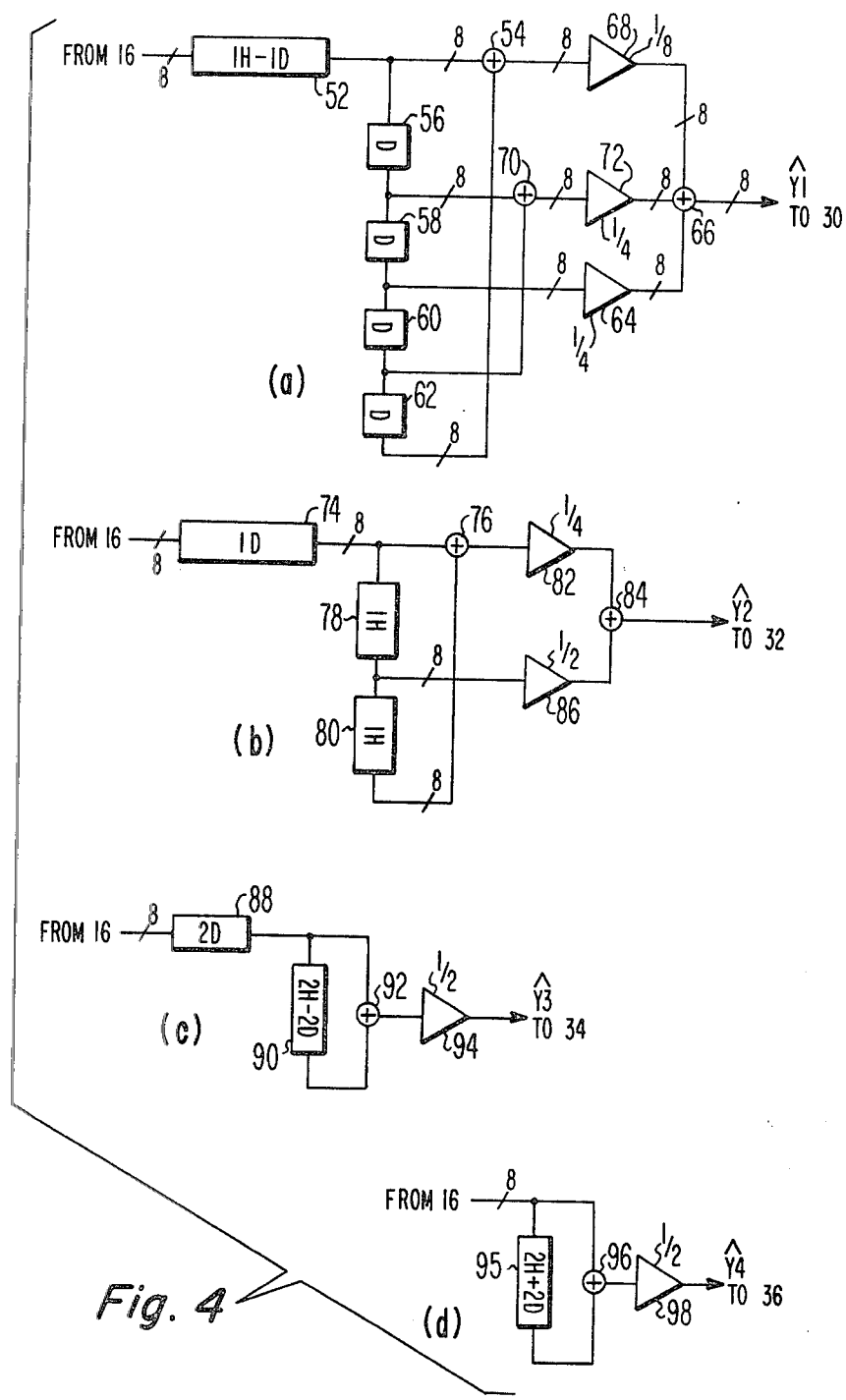
FIG. 4 shows filters used in FIG. 3.

In digital television, the video signals are digitized (sampled and then quantized) with a sampling frequency that preferably is four times the color subcarrier frequency, or 14.32 MHz for an NTSC video signal. Such signals when in component form comprise a luminance signal Y and two chroma signals, called I and Q, which chroma signals are in ninety degree phase relationship with respect to each other and modulate the chrominance subcarrier signal. The phase of the sampling signal is preferably chosen so that a first of the sampling times occurs when the I signal is a maximum. This means that the Q signal is zero due to the ninety degree phase shift therebetween. Thus the sampled signals at said first sample time comprises the luma and the I signal (Y and I). The second sample time occurs at a period of 1/14.32 MHz=70 nanoseconds after the first sample time. This duration is one-quarter of a period of the subcarrier which comprises a ninety degree phase shift of the subcarrier so that now the amplitude of I is zero and Q has its maximum value. Thus, the sampled signals at the second sampling time are Y and Q. The third sampling time corresponds to a total phase shift of 180 degrees of the subcarrier signal from the first sampling time. Again, I has its maximum value, but with the 180 degree phase shift, while Q=0. Thus, the sampled signals are Y and ($-$I). The fourth sampling time has a total phase shift of 270 degrees from the first sampling time. The Q signal is at its negative maximum, while I=0. Thus, the sampled signals are Y and ($-$Q). The fifth sampling time has a 360 degree phase relationship with respect to the orginal sampling time, which means that the sampled signals are in phase with the signals at the first sample time, so that the sampled signals again comprise Y and I. Thus, the sequential samples are Y and I, Y and Q, Y and ($-$I), Y and ($-$Q), Y and I, Y and Q, Y and ($-$I), etc., for a total of 63.5 $\mu$s/70 ns, or 910 samples per line for an NTSC signal.

FIG. 1 shows samples for three vertically adjacent televison lines of one field of a scanning raster. The upper row of each line represents the luminance samples in one channel, while the lower row shows the alternate chrominance samples in a second channel. In particular, the luminance signal is sampled at four times the color subcarrier frequency, while I and Q are effectively sampled at twice said frequency due to the fact that they have zero values every other sample as explained above. This is known as a 4:2:2 system. The signals of FIG. 1 are the source signals for the present invention.

FIG. 2 shows the composite video which is to be produced from the component signals of FIG. 1. Note that this can be done simply by alternately adding and subtracting corresponding luminance and chrominance components of the same line. The present invention retains for each sample the original luminance signal from the component video, compares it to several versions of a luminance signal derived from the composite signal samples proximate each sample, and inserts "steering bits" which indicate which of said versions is the best match to the original luminance signal and hence the best method of decoding the composite signal. Obviously, the closer the decoded Y signal is to the original Y signal, the closer the decoded chrominance signal will be to its original value, since chroma is the difference between the decoded Y sample and the composite sample. Hence, one set of steering bits serves to improve both luminance and chrominance decoding for any one composite sample. Having steering bits to indicate the best spatial direction for filtering to decode Y will not only reduce the crosstalk problems, it also provides a means to prevent degradation of the picture with successive transcodings between composite and component forms, since the steering bits are always regenerated upon the composite encoding.

FIG. 3 shows a block diagram of a component-to-composite encoder. A television signal source, such as a camera (not shown), provides Y, I and Q signals that are then sampled at said 4:2:2 respective sampling frequency ratios with respect to the color subcarrier frequency. The sampled signals may be then quantized using 8 bits (256 grey levels). The resulting digitized Y, I and Q signals, such as shown in FIG. 1, are then respectively applied to 8-bit inputs 10, 12 and 14, which inputs in turn are connected to composite encoder 16. Input 10 also applies the Y signal to 8-bit equalizing delay line 18 (eight delay lines, one for each bit) that has a delay of 1H+1D.

Within encoder 16 the I and Q signals are applied to respective inputs of 8-bit (8PDT) switch 20, which switch goes through a complete alternate position cycle at twice the subcarrier frequency. Thus I and Q signals are alternately provided to one input of 8-bit switch 22 and to the input of 8-bit inverter (8 inverters, one for each bit) 24, which inverter has an output coupled to the remaining input of switch 22. Switch 22 goes through a complete alternate position cycle at the subcarrier frequency rate to provide from its output a phase alternating chroma signal to an input of 8-bit adder 26. Adder 26 also receives at its remaining input the Y signal present at input 10, and thus provides at its 8-bit output, which is also the output of encoder 16, a composite video signal as shown in FIG. 2.

The composite video signal from encoder 16 is applied to filters 1, 2, 3 and 4 that re-separate the Y from the chroma signals in different ways, as well as to 8-bit equalizing delay line 28, which has a delay of 1H+1D. Filter 1 is a filter which computes a weighted average from five sequential horizontal samples (shown with superscript 1 in FIG. 2) to obtain a luminance sample $\hat{Y}_1$. Filter 2 is a comb filter which computes a weighted average from three vertically aligned samples (shown with superscript 2) to obtain a luminance sample $\hat{Y}_2$. It is noted that the center sample has both superscripts 1 and 2, and this sample is the reference sample for purposes of discussion. Filter 3 averages a pair of diagonal samples (shown with superscript 3) to obtain a luminance sample $\hat{Y}_3$. Similarly, filter 4 averages a different pair of diagonal samples (shown with superscript 4) to obtain a luminance sample $\hat{Y}_4$. All of said filters have the same average delay of 63.5 $\mu$s (microseconds) +70 ns (nanoseconds) for NTSC which is called "1H+1D." The signals $\hat{Y}_1$, $\hat{Y}_2$, $\hat{Y}_3$ and $\hat{Y}_4$ are applied to the positive inputs of 8-bit subtractors 30, 32, 34 and 36 respectively. Delay line 18 applies the original Y component samples at input 10 to the negative inputs of said subtractors, delayed by 1H+1D, which is the same as the average delay of said filters. Thus, the original Y component samples are delayed to occur simultaneously with the luminance estimates which are provided by said four filters to said subtractors. The differences between said estimates and the actual luminance value are computed, and the absolute values of said differences from said subtractors 30, 32, 34 and 36 are then compared by absolute value circuits 38, 40, 42 and 44 respectively. The resulting absolute value signals are then applied to minimum select circuit 46 which provides 2 output bits which indicate the smallest of the four absolute value input signals. Thus, a pair of steering bits are provided on 2-bit bus 48 that indicate the best manner to decode the composite signal. Delay equalized composite video signals are applied to 8-bit bus 50 from delay line 28.

FIGS. 4a, 4b, 4c and 4d show the details of filters 1, 2, 3 and 4 respectively. In FIG. 4a, the output signal of encoder 16 at a particular time $t_0$ comprises the samples $Y+Q^4$ on line 3 and said sample is applied to 8-bit delay of line 52, which has a delay of 1H−1D (63.5 $\mu$s−70 ns). The output of delay line 52 at this same time $t_0$ comprises the right-hand sample $Y+I^1$ on line 2 (delaying up one line and one sample to the right from sample $Y+Q^4$) which is applied to 8-bit adder 54 and to a chain of serially coupled 8-bit delay lines 56, 58, 60 and 62, each having a delay of 1D (70 ns). The output of delay line 62 has a total delay with respect to the input signal of delay line 52 of 1H+3D, i.e., it comprises at time $t_0$ sample $Y+I^1$ which is shown near the left end of line 1 in FIG. 2. The signal from delay line 62 is applied to the remaining input of adder 54 and the 8-bit output signal from adder 54, which is of the form $2(Y+I^1)$, has its amplitude or value divided by eight by divider 68. The output signal from divider 68, which is of the form $2(Y+I)/8$, is applied to an input terminal of adder 66. The output signal from delay line 56 has a total delay of 1H, and thus at $t_0$ comprises the $Y-Q^1$ sample on line 2. It is applied to adder 70. The output signal from line 60 has a total delay of 1H+2D, and thus comprises the sample $Y+Q^1$ on line 2. It also is applied to adder 70. The output signal from adder 70 is 2Y (ideally the Q components having cancelled each other), and it is divided by four by divider circuit 72. Thus, the output signal from circuit 72 is of the form 2Y/4, and it is applied to adder 66. The output signal from delay line 58 has a total delay of 1H+1D, and thus comprises the sample $Y-I^{1,2}$ (the center reference sample). It is divided by four by divider 64 and applied to 8-bit adder 66. Thus, the $\hat{Y}$ output signal from adder 66 is Y/4+Y/4+Y/2=Y, which matches the amplitude of the Y signal from delay line 18 of FIG. 3 but which is made up from adjacent horizontal samples on line 2. The chroma output signal from adder 66 ideally is 2I/8=0-Q−I/4=0.

FIG. 4b shows the details of filter 2. The signal from encoder 16 is applied to an 8-bit 1D delay line; and thus the output signal thereof is sample $Y+I^2$ on line 3 of FIG. 2. This output signal is applied to 8-bit adder 76, and a chain of two 8-bit 1H delay lines 78 and 80. Thus, the output signals of delay lines 78 and 80 are samples $Y-I^{1,2}$ on line 2 and $Y+I^2$ on line 1 respectively. The output signal from line 80 is applied to 8-bit adder 76. The adder 76 output signal is of the form $2(Y+I)$ which is divided by 4 by 8-bit divider 82 and applied to 8-bit adder 84. The output signal from line 78 is divided by 2 by divider 86 and applied to adder 84. Thus, the output signal from adder 84 is $[2(Y+I)/4]+[(Y-I)/2]=Y$, the I components having ideally cancelled.

FIG. 4c shows the details of filter 3. The signals from encoder 16 are applied to 8-bit 2D delay line 88. The output signal thereof is the sample $Y-Q^3$ on line 3 and is applied to 8-bit 2H−2D delay line 90 and 8-bit adder 92. The output signal from delay line 90 is the sample $Y+Q^3$ on line 1 and is applied to adder 92. During addition, the Q components ideally cancel so the output signal from adder 92 has the form 2Y, which is then divided by 2 by divider 94 to produce the $\hat{Y}_3$ signal.

FIG. 4d shows the details of filter 4. It will be recalled from the discussion of filter 1, that the current output signal from encoder 16 is the sample $Y+Q^4$ on line 3. This signal is applied to 8-bit $2H+2D$ delay line 95 and to 8-bit adder 96. Thus, the output signal from delay line 95 is the sample $Y-Q^4$ on line 1. When this sample is added to the signal from encoder 16 by adder 96, the Q components ideally cancel, thus producing the signal 2Y. This signal is divided in 2 by divider 98 to produce the signal $\hat{Y}_4$.

It is noted that for all filters, the output signals have no chroma component if there is no color change in the direction of filtering. Further, the output signals have an average delay of $1H+D$ due to the centering of the added samples about sample $Y-I^{1,2}$ which has this delay with respect to current sample $Y+Q^4$. This matches the delay of equalizing delay lines 18 and 28.

Figure 5:
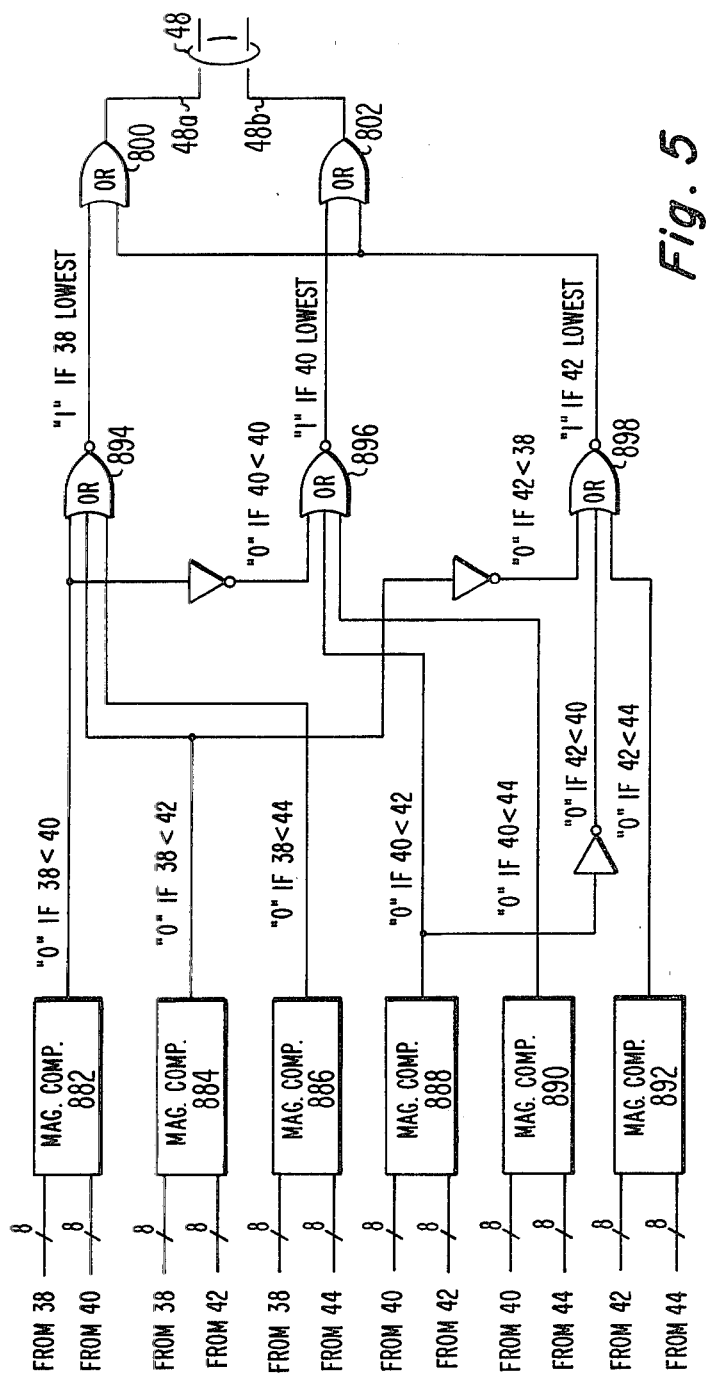
FIG. 5 shows the details of a minimum select circuit used in FIG. 1.

As shown in FIG. 5, minimum select circuit 46 comprises 6 magnitude comparators 882, 884, 886, 888, 890 and 892, each of which receives two 8-bit numbers from different pairs of the output signals of absolute value circuits 38, 40, 42 and 44 and supplies at its respective output a one-bit logic level indication to indicate which of the two respective input numbers is smaller. It should be noted that there are only six possible combinations of four numbers taken in pairs, thus giving rise to the six magnitude comparators. It is only necessary to look at three of the magnitude comparator outputs to determine if a specific magnitude comparator input is the lowest. Thus, NOR gates 894, 896 and 898 are used to detect if the output signal from circuits 38, 40 and 44 respectively are the lowest. If none are the lowest, the output signal from circuit 44 is assumed to be the lowest which will be true, or none will be lowest, i.e., they are all equal, in which latter case the output signal from any absolute value circuit will be satisfactory for indicating which decoding direction is best. The output signals from gates 894, 896 and 898 are coded by OR gates 800 and 802 into the 2-bit control signal on bus 48 in accordance with the following truth table:

| LINE NO. | LOWEST SIGNAL | | | |
|---|---|---|---|---|
| | 38 | 40 | 42 | 44 |
| 48a | 1 | 0 | 1 | 0 |
| 48b | 0 | 1 | 1 | 0 |

The output of logic circuit 46 comprises two bits in accordance with the above table which indicate which of the combinations of samples of adjacent points is the closest match, i.e., represents which direction has the least change of the video signal around the reference sample point $Y-I^{1,2}$. This two-bit signal makes up the control signal indicating which of the combinations of surrounding samples of the transmitted sample signal has a luminance component which most closely represents the luminance component of the transmitted composite signal.

Figure 6:
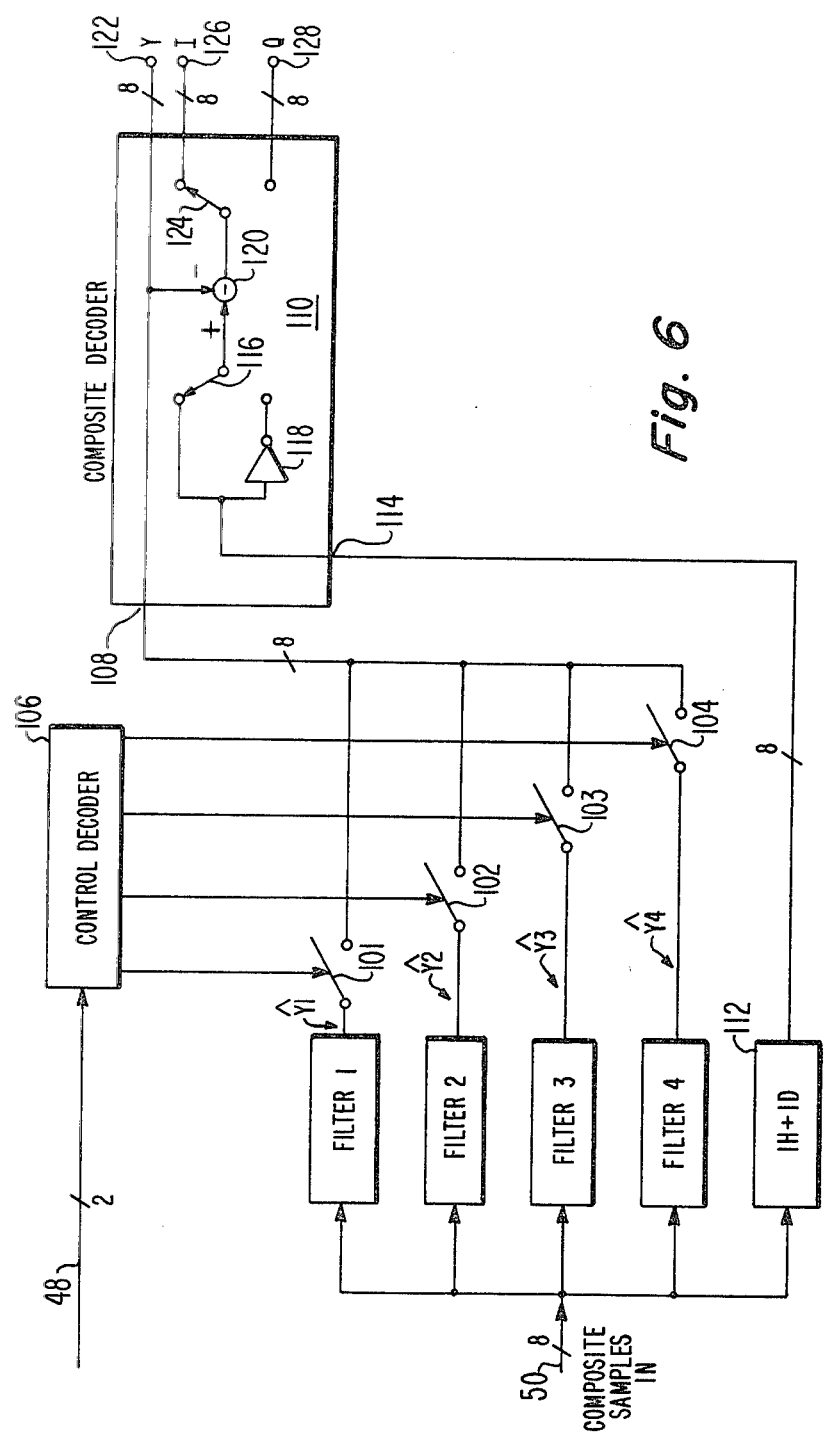
FIG. 6 is a block diagram of a composite-to-component transcoder in accordance with the invention.

FIG. 6 shows a block diagram of a composite-to-component transcoder. The composite samples on bus 50 are applied to 8-bit filters 1, 2, 3 and 4 which are identical to the corresponding numbered filters of FIGS. 4a, 4b, 4c and 4d respectively. The outputs of filters 1, 2, 3 and 4 comprise the signals $\hat{Y}_1, \hat{Y}_2, \hat{Y}_3$ and $\hat{Y}_4$ respectively and are applied to 8-bit switches 101, 102, 103 and 104 respectively. The steering bits on 2-bit bus 48 are applied to control decoder 106. This decoder comprises a one-of-four decoder that takes the two control bits and gives a four-bit parallel output, only one of which will be high. The four parallel bits are applied as control signals to the switches 101, 102, 103 and 104 respectively. Since only one of the outputs of control decoder 106 will be high, only one of the switches 101, 102, 103 and 104 will be closed. This applies the signal from that one of the filters 1, 2, 3 and 4 which has a luminance component which is the closest match for the luminance component of the composite signal to input 108 of composite decoder 110.

The composite signal on bus 50 is delayed by 8-bit delay line 112 for a delay time of $1H+1D$, which it will be recalled is the average delay of the filters, and the thus delayed signal is applied to input 114 of decoder 110.

Within decoder 110, the delay composite signal at input 114 is applied to one input terminal of 8-bit switch (8PDT) 116 and to 8-bit inverter 118, the output of inverter 118 being coupled to the remaining input of switch 116. Switch 116 goes through a complete alternate position cycle at the subcarrier frequency rate to provide at its output a composite signal that no longer has an alternating signal chroma component. This output signal is applied to 8-bit subtractor 120. The best estimate luminance signal present at input 108 is applied to the negative input of subtractor 120 as well as to the 8-bit output 122. In subtractor 120, the luminance signal is subtracted from the composite signal to provide the chroma signals. The chroma signals are applied to switch 124, which goes through a complete alternate position cycle at a rate twice the subcarrier frequency, and thus 8-bit I and Q chroma signals are present at 8-bit outputs 126 and 128 respectively. It will therefore be seen that the original component signals Y, I and Q have been recreated with a sampling ratio of 4:2:2 with respect to the chroma subcarrier frequency and with a minimum of degradation by the use of steering bits. If it is again desired to convert to composite form, the same steering bits will be generated with respect to the same reference sample, and thus there is no successive degradation build up with successive transcodings.

The minimum select circuit 46 shown in detail in FIG. 5 has no selected priority order for the filtering direction if there is a tie for the minimum absolute value. If a particular priority order in the event of such a tie is desired a minimum select circuit such as shown in FIG. 5 of U.S. patent application Ser. No. 197,290, filed Oct. 15, 1980 and assigned to the same assignee as the present invention, can be used instead of the circuit of FIG. 5 herein.

What is claimed is:

1. A method comprising forming a composite video signal from component video signals, transmitting samples of said composite video signal, and transmitting a control signal indicative of which of combinations of surrounding samples of said transmitted samples has a component that provides the closest match to the corresponding component of the original component video signals.

2. A method as claimed in claim 1, wherein said components comprises luminance components.

3. A method as claimed in claim 1, wherein said first recited transmitting step comprises transmitting a luminance component together with an alternating one of an inphase and quadrature chroma signal.

4. A method as claimed in claim 1, wherein said second recited transmitting step comprises subtracting said corresponding component from said combinations to form differences, determining the minimum absolute value of said differences and generating said control signal to indicate said minimum absolute value.

5. A method as claimed in claim 1, wherein said second recited transmitting step comprises filtering said composite signal to provide said combinations so that substantially no amount of non-corresponding components remain.

6. A method as claimed in claim 5, wherein the corresponding and noncorresponding components comprise luminance and chroma signals.

7. A method as claimed in claim 1, wherein said samples comprise digital samples.

8. A method for receiving samples of a composite video signal and a control signal indicative of which of combinations of surrounding samples of said received samples has a component that provides the closest match to the corresponding component of said received samples of said composite signal, said method comprising generating said components of said surrounding combinations from said received composite signal samples, selecting said closest match component using said control signal, and subtracting said closest match component from said composite signal to produce non-corresponding components.

9. An apparatus comprising means for forming a composite video signal from component video signals, means for transmitting samples of said composite video signal, and means for transmitting a control signal indicative of which of combinations of surrounding samples of said transmitted samples has a component that provides the closest match to the corresponding component of the original video signal.

10. An apparatus as claimed in claim 9, wherein said components comprises luminance components.

11. An apparatus as claimed in claim 9, wherein said first recited transmitting means transmits a luminance component together with an alternating one of an inphase and quadrature chroma signal.

12. An apparatus as claimed in claim 9, wherein said second recited transmitting means comprises means for subtracting said corresponding component from said combinations to form differences, means for determining the minimum absolute value of said differences and for generating said control signal to indicate said minimum absolute value.

13. An apparatus as claimed in claim 9, wherein said second recited transmitting means comprises means for filtering said composite signal to provide said combinations so that substantially no amount of non-corresponding components remain.

14. An apparatus as claimed in claim 13, wherein the corresponding and non-corresponding components comprise luminance and chroma signals.

15. An apparatus as claimed in claim 9, wherein said samples comprise digital samples.

16. An apparatus for receiving samples of a composite video signal and a control signal indicative of which of combinations of surrounding samples of said received samples has a component that provides the closest match to the corresponding component of said received samples of said composite signal, said method comprising means for generating said components of said surrounding combinations from said received composite signal samples, means for selecting said closest match component using said control signal, and means for subtracting said closest match component from said composite signal to produce non-corresponding components.

* * * * *